March 19, 1946.     J. SZYDLOWSKI     2,397,060
COMPRESSOR
Filed March 8, 1941
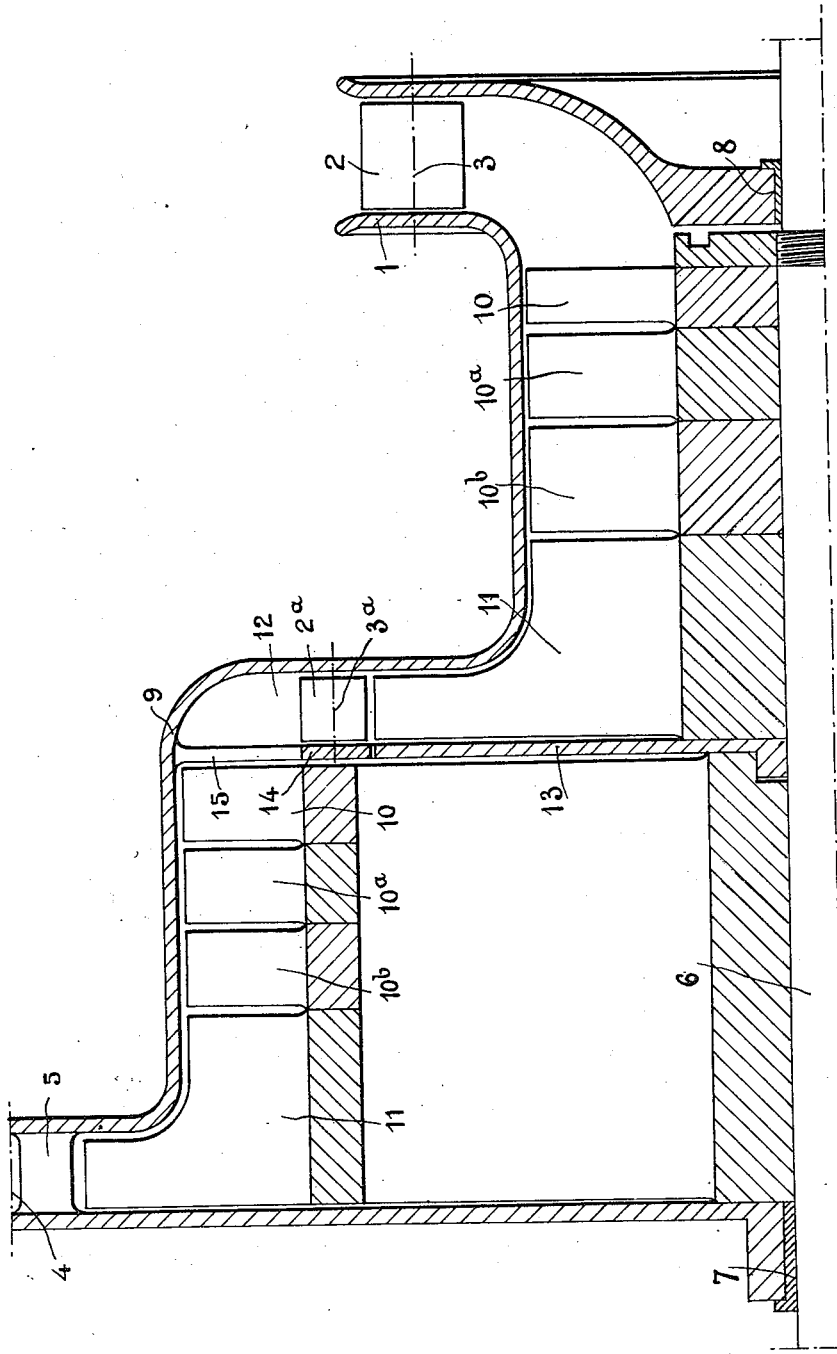
INVENTOR:
JOSEF SZYDLOWSKI
BY Haseltine, Lake & Co.
ATTORNEYS Patented Mar. 19, 1946

2,397,060

UNITED STATES PATENT OFFICE 2,397,060

COMPRESSOR

Josef Szydlowski, Saint Pe de Bigorre, France; vested in the Alien Property Custodian Application March 8, 1941, Serial No. 382,284
In France March 4, 1940

5 Claims. (Cl. 230—114)

The present invention concerns machines for displacing and compressing fluids, such as turbo-compressors for feeding aircraft engines.

In order to reduce weight, such a turbo-compressor is permanently coupled to the shaft of the aircraft engine, and the speed of its rotor is therefore that of the engine shaft. When the aircraft is on the ground or flying at low altitude, the turbo-compressor does not produce an appreciable compression due to the degree of atmospheric pressure. Thus, under such circumstances, it absorbs a part of the engine power without producing a useful effect. It is the purpose of this invention to provide adjustable means for reducing the amount of power absorbed by the turbo-compressor, at low altitude, such means serving also to increase the amount of pressure developed by the turbo-compressor when the aircraft is at high altitude.

If $C_1$ is the tangential component of the speed of the fluid at the inlet of the rotor, $C_2$ the tangential component of the fluid at the outlet, $r$ the corresponding radius of $C_1$ at the inlet, $R$ the radius corresponding to $C_2$ at the outlet, the torque absorbed by the machine per unit of weight of the fluid is proportional to:

$$P = C_2R - C_1r$$

The value of P, and consequently, that of the power absorbed, can be theoretically lowered:

By giving to the term $C_1r$ an absolute value as near as possible to that of $C_2R$.

However, $C_1$ cannot exceed an upper limit which is the speed of sound. For practical reasons, $r$ cannot be as great as R.

By giving $C_2$ a value approximating $C_1$.

This solution is inadmissible since $C_2$ which must subsequently be converted into pressure must be as high as possible.

At a high altitude, it is necessary to increase as much as possible the pressure generated by the machine and, consequently, the value P and, as the working speed of the engine, that is to say, the angular speed of the rotor of the turbine, as assumed, remains constant, in order to do so, a negative value is given to $C_1r$ ($C_1$ being in this case limited below the speed of sound). The torque absorbed by the machine becomes proportional to:

$$C_2R + C_1r$$

The invention has for its object or industrial result, to reduce on the ground or at low altitude the difference:

$$C_2R - C_1r$$

and to increase, at high altitude, the sum:

$$C_2R + C_1r$$

For that purpose, the invention mainly involves imparting to the fluid, at the outlet of the part of the rotor having purely a centrifugal action, a tangential component of variable value, negative or positive, which constitutes the tangential component of admission into a second machine, and so on.

This definition of the principle of the invention results in the fact that, if $C_3$ is the tangential speed of the radius $r_3$ at the inlet of the second machine, the two values:

$$P = C_2R - C_1r$$

on the ground and $$P_a = C_2R + C_1r$$

in altitude become respectively:

$$P_3 = C_2R - C_1r - C_3r_3$$

on the ground and $$Pa_3 = C_2R + C_{1a}r + C_3r_3$$

in altitude.

With a structure of $n$ machines arranged according to the invention, will be obtained:

$$P_n = C_2R - C_1r - C_3r_3 \ldots - C_nr_n$$

$$Pa_n = C_2R + C_{1a}r + C_3r_3 \ldots + C_nr_n$$

As regards the construction, the invention consists in associating the machines in such manner that the inlet of one is connected to the outlet of the preceding one, doing away with the usual diffuser placed at each outlet and maintaining only the inlet guiding blades which impart to the fluid the required tangential component.

The single figure of the accompanying drawing illustrates, by way of example only, a form of construction of a turbo-compressor having two rotors, according to the invention. This figure is a somewhat diagrammatic axial half-section, of the machine.

The inlet of the machine is provided on the periphery of the ring 1. In this inlet are arranged the blades 2 pivoted about spindles 3 so as to be adjusted in such manner that they impart to the fluid the required tangential component. The outlet is provided at 4, through the usual diffuser 5.

On the same driving shaft 6 mounted in the bearings 7 and 8 of the casing 9, are rigidly secured two rotors, each of which has the main arrangement of known machines and comprises, on the one hand, distinct sets of blades 10, 10a, 10b, the main function of which is to avoid the separating effect noticed in continuous curved surfaces on the upstream side of turbo-compressors and, on the other hand, radial sets of blades 11 having purely a centrifugal action.

For obtaining a continuous path for the fluid with the minimum deviation, the outlet 12 of the first rotor is combined with the inlet of the second rotor, guiding blades 2a pivoted about spindles 3a allowing to impart to the fluid, when it enters the second rotor, the required tangential component, for the purpose described in the preamble to the present specification.

The machine illustrated comprises only two rotors, but it is obvious that it could be provided with a greater number.

The diagrammatic illustration contemplated comprises a disc 13 separating both rotors, rotating with the shaft 6, the spindles 3a of the guiding blades being supported, on the one hand, on the casing 9 and, on the other hand, by means of a ring 14 connected by narrow arms 15, suitably profiled, to the casing 9.

This arrangement is only given by way of indication and the disc 13 might be done away with, and the spindles 3a mounted in overhanging position on the casing 9.

The control of the orientation or setting of the blades 2a can be independent from or combined with that of the blades 2.

What I claim as my invention and desire to secure by Letters Patent is:

1. In a machine for displacing and compressing fluids, a plurality of turbo-compressors each comprising a rotor, said rotors being arranged to rotate in a casing, and each rotor being provided with an inlet port and an outlet port for the fluid, a connecting enclosure for connecting the outlet port of one rotor to the inlet port of the following rotor, and outlet guiding blades capable of being adjusted, in each outlet port for imparting to the fluid a tangential component, variable in value and in direction, at least at the first inlet port in the machine, said guiding blades having at least portions thereof projecting beyond the outer diameter of the rotor with which it is associated.

2. In a machine for displacing and compressing fluids, a casing comprising an inlet port and an outlet port for the fluid, two rotors each comprising a series of radially projecting helical blades and a set of centrifugal blades, a driving shaft common to said rotors, a wall rotating with the said shaft and separating the casing into two chambers each of which contains one of the rotors, connecting means containing a peripheral cavity for connecting both chambers, guiding blades, capable of being adjusted, arranged in said cavity at the outlet port of the first rotor and at the inlet port of the second, for imparting to the fluid a tangential component variable in value and in direction, further guiding blades, capable of being adjusted at the inlet of the casing, and a diffuser in the outlet port of said casing.

3. A machine according to claim 1, wherein one rotor is of greater diameter than the preceding in the series and the connecting enclosure for connecting the outlet port of one rotor to the inlet port of the following rotor is located in a position exteriorly beyond the outer diameter of said preceding rotor.

4. A machine according to claim 2, wherein the blades of one rotor are disposed in a position thereon exteriorly beyond the extreme outer diameter of the blades of the preceding rotor in the series.

5. A machine according to claim 2, wherein the final plates upon each rotor have portions thereof projecting radially beyond the general diameter of the rotor and the other blades thereon so as to form the centrifugal blades.

JOSEF SZYDLOWSKI.